Feb. 21, 1967 E. H. GRIFFIN ETAL 3,305,832

END OF CHARACTER DETECTOR

Filed Sept. 24, 1962 3 Sheets-Sheet 1

INVENTORS
EUGENE H. GRIFFIN
JAMES W. GUNN
BY John R. Manning
ATTORNEY

Feb. 21, 1967 E. H. GRIFFIN ETAL 3,305,832

END OF CHARACTER DETECTOR

Filed Sept. 24, 1962

3 Sheets-Sheet 2

Feb. 21, 1967 E. H. GRIFFIN ETAL 3,305,832

END OF CHARACTER DETECTOR

Filed Sept. 24, 1962

3 Sheets-Sheet 3

3,305,832
END OF CHARACTER DETECTOR

Eugene H. Griffin, Dallas, and James W. Gunn, Garland, Tex., assignors to Sperry Rand Corporation, New York, N.Y., a corporation of Delaware Filed Sept. 24, 1962, Ser. No. 225,751
12 Claims. (Cl. 340—146.3)

This invention relates to character recognition systems and more specifically to means for detecting when the character recognition system should be signalled and the recognition circuits interrogated.

Character recognition systems known to the prior art were subject to a number of disadvantages. In most instances the device was of such a nature that the system would not function properly unless the character being scanned was clear, distinct, well defined and registered very accurately relative to a predefined area. A scanned symbol that was slightly misplaced either vertically or horizontally, or the presence of a symbol that is not distinct and well defined, will probably remain unidentified or cause an erroneous identification. In other instances, the prior art devices were unable to recognize conventionally formed characters. The characters had to be deformed or given unconventional shapes which were advantageous to machine reading but which detracted from human legibility. Moreover, printing means equipped with special type faces had to be employed for forming these characters on the character-bearing document. Often these prior devices were unfeasible because they required the use of complicated moving parts such as rotary stencils, whirling discs, and rotating mirrors which had to be matched with the characters. Practically all types of character recognition systems are limited to the identification of a relatively small number of symbols and the programming of the devices for the recognition of other symbols is very difficult if not impossible.

Accordingly, it is desirable that a character recognition system be capable of reading and identifying a large number of characters or symbols, which may be formed by any known and commonly employed printing means. It is further desirable that the system be capable of reading and identifying non-registered characters, i.e., characters oriented in fields which are randomly placed upon the document. Also, the character reading system must be capable of reading smeared characters, characters having smudges between the characters, characters formed upon mutilated documents and improperly formed characters.

The present invention relates to a system of character recognition wherein a camera tube, normally utilized in the television art, is employed to vertically sweep across a character formed on its face and be capable of generating a read or interpret signal near the end of the scanning of the character. If means are not employed to determine when the scanning of the character is substantially completed, then a smeared character or characters having smudges between the characters will continue to be scanned and cause an erroneous identification or generate an unidentifiable signal.

Character scanning systems are known wherein the character is scanned a predetermined number of times. The disadvantage of these systems lies in that narrow characters (such as an i) and the wider characters (such as an m or a w) would be scanned an equal number of times and reduce the scanning and identifying rate. In addition, a narrow character followed by an ink smudge or other undesirable marking between the characters would also be read and provide an erroneous identification. Other systems are known wherein the character is scanned for a predetermined time or until a completely white scan is obtained. The disadvantage of these systems are obvious and are similar to those just described.

Accordingly, it is the principal object of the present invention to improve character scanning techniques.

It is another object of the present invention to provide an improved character recognition device that can identify conventional symbols.

It is a further object of the present invention to provide an improved character recognition system that is capable of accurately identifying symbols that are out of register.

It is a still further object of the present invention to provide a character recognition system that is capable of accurately identifying characters and symbols that are somewhat smudged, deformed or contain smudges between the characters.

It is still another object of the present invention to provide a character reading system capable of reading characters on mutilated documents.

It is a further object of the present invention to provide a system of identifying when the character has been substantially scanned and providing additional means for overriding in certain instances the first means to determine when the character has been substantially scanned.

It is a still further object of the present invention to provide a character recognition system wherein the failure of one portion of the system to signal that the character has been scanned and an identifying signal derived, will not cause erroneous identification.

In accordance with the present invention, the character-bearing document is passed in front of the face of a television camera tube and a strobing of a light source causes the characters on the character-bearing document to be retained on the face of the camera tube. The horizontal and vertical sweep circuits of the camera tube commence sweeping across the character which signals provide the identifying signal output train peculiar to each character so scanned. Near the end of the scanning of a character, character recognition circuits will indicate that a particular threshold level has been reached (correlation is imminent) and that the signals generated must be identified in order to identify the character so scanned. A plurality of means are now employed to determine that scanning of the character has been completed by the camera scanning beam at the appropriate time after the threshold signal has been generated. The first means to indicate that the scanning is complete will cause appropriate action and the failure of one of the means to signify that the character has been scanned will be overridden by any one of the other separate systems to so signify. After the scanning of an entire field has been completed, the beam must be blanked and the face of the camera tube must be erased and the entire system reset to commence immediately the scanning of the next character in a subsequent field.

One such means for determining that the scanning action of the beam has been completed comprises the incorporation of a preset counter which will permit scanning for a predetermined number of strokes; however, this system is ineffective when searching for the first character. This system for indicating that scanning has been completed will be overridden by other systems to be hereinafter described, during the case of the scanning of characters having short horizontal widths, since the total stroke counter must be set to be compatible with the scanning of a character having the widest horizontal dimension. Secondly, since the number of clock pulses of the system are a function of the number of total strokes provided for in the scanning operation, additional means may be employed to indicate that scanning is complete at the end of a particular or predetermined number of clock pulses. Again, this system will be overridden by other systems to be hereinafter described in the case of the scanning of the shorter horizontal width characters.

A third system for indicating scanning is completed is to employ a preset counter to count the number of black video strokes after the threshold signal has been generated. Employment of this system will provide a rapid identification of the characters having short horizontal widths and will prevent the scanning operation from scanning smudges or smears contained between the characters. This system is particularly useful when the total stroke counter and the clock pulse counter have been inhibited during the searching for the first character.

The fourth system takes over and generates a read command to the recognition circuits as soon as an all white video stroke is encountered after the threshold signal has been generated. The system may be readily modified to produce the read command after two or more white strokes have been encountered.

Thus, the character reading system employs a plurality of independent circuits to generate the read commands to the recognition circuits. The first system to determine that the character has been scanned and that the read command should be generated, will generate the read command causing identification of the character. At the end of scanning a field of characters, not only will the read command be generated but the video will be blanked, the face erased, and the system reset for immediate identification of the next character in a subsequent field.

Further features and objects of the invention will be found throughout the more detailed description and a better understanding will be afforded by the following detailed description considered in conjunction with the accompanying drawings in which.

Figures 1, 6:
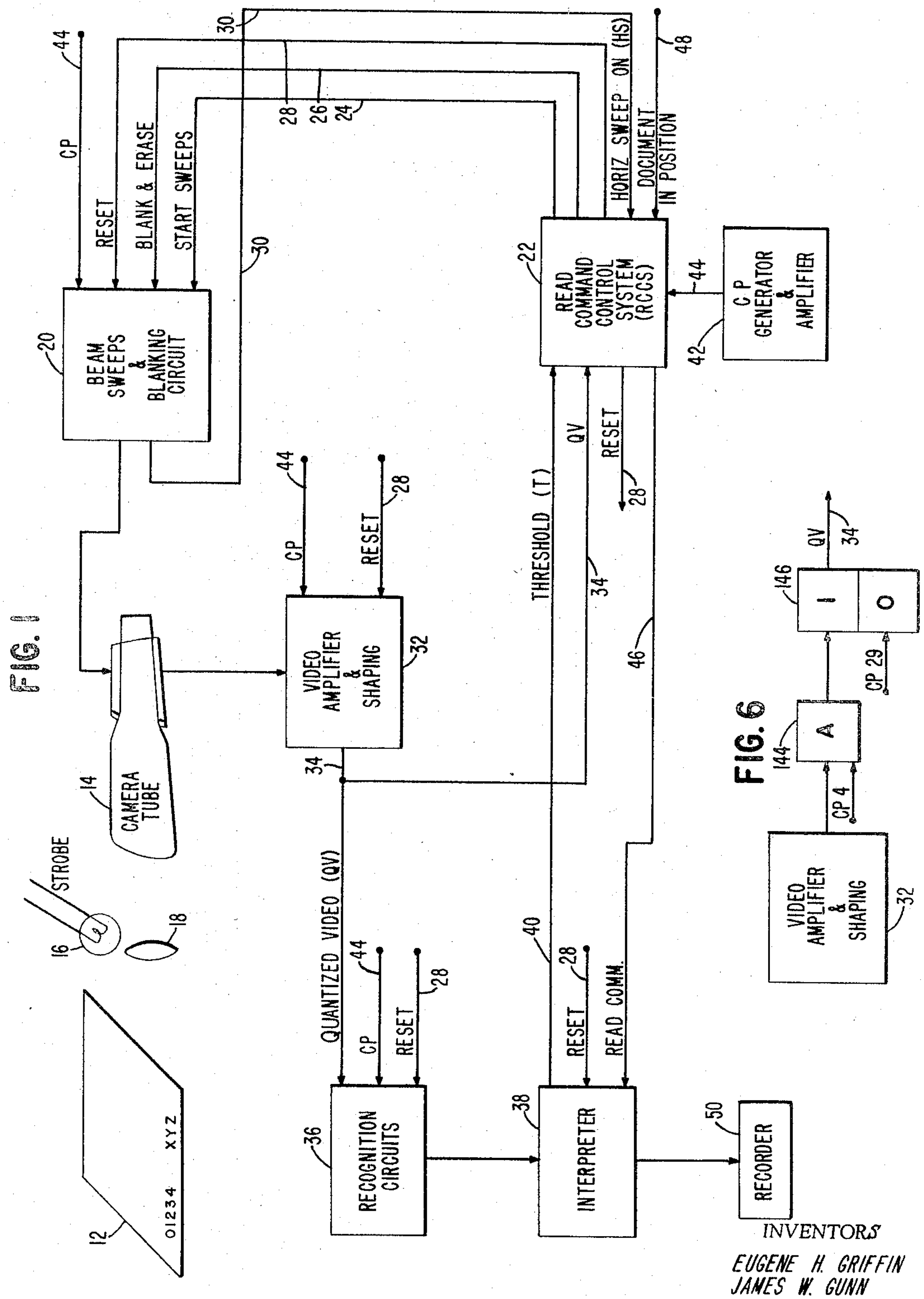
FIGURE 1 is a block diagram of a character recognition system employing the read command control system (RCCS) of the present invention.
FIGURE 6 is a schematic and block diagram showing the generation of the quantized video signals utilized in FIGURE 2.

As shown in the FIGURE 1, a document 12 is passed in front of the face of a camera tube 14. The area of the character-bearing document is illuminated by a strobe light 16 at the appropriate time and the characters on the character-bearing document 12 are focused on the face of the camera tube 14 through a lens system 18. The beam sweeps and blanking circuit 20 is coupled to the camera tube 14 to drive the electron beam of the camera tube 14 in a sweeping manner across the image of the characters transferred from the character bearing document 12 to the face of the camera tube 14. The circuit 20 may contain a vertical sweep amplifier, a horizontal sweep amplifier and blanking circuits which are well known in the art. The vertical and horizontal sweep amplifiers cause the electron beam of tube 14 to move vertically and horizontally, respectively. The vertical sweep provides the individual sampling strokes while the horizontal sweep causes these strokes to be displaced, horizontally, across the image of the character being sensed. The blanking circuits remove any indications which may be produced during the retrace of the sweep circuits. Additionally, the blanking circuits can provide the erasing signals when desired.

The RCCS (Read Command Control System) circuit 22 provides a signal on the conductor 24 to commence the vertical and horizontal sweeps of the circuit 20. Blanking and erase signals are provided from the RCCS 22 to the circuit 20 via the conductor 26. In addition, reset pulses are supplied via the conductor 28 which are also supplied to the remaining elements of the FIGURE 1 as shown. The beam sweeps and blanking circuit 20 signals the RCCS 22 that the horizontal sweep is on, via conductor 30.

The camera tube 14 supplies video signals to a video amplifier and shaping circuit 32, which circuit may be of a type well known in the art. Quantized video (QV) is supplied to the RCCS 22 via the conductor 34 and to the recognition circuits 36 via the same conductor. Quantized video is the signal derived as a result of the scanning technique wherein a plurality of spots are sampled during the scanning of a particular character and if the spot so sampled is a portion of the character (a black spot), then an output signal of one polarity is derived on the conductor 34. If the sampled spot is background material (a white spot), then either no signal is derived or a signal of the opposite polarity is generated. In other words, the video amplifier and shaping circuit 32 provides outputs on the conductor 34 of two levels only; a first voltage level if the scanning beam of the camera tube 14 samples a portion of the character retained on the face of the camera tube and a second voltage level if the scanning beam engages or samples a portion of the background material. Such a circuit to derive this type of output may be a commonly known Schmitt trigger which provides either a continuous output or no output when a white spot is sampled and provides a different output when a signal of predetermined level is applied to the trigger.

The recognition circuits 36 and the interpreter 38 are devices to receive the video signals and identify the character so scanned by interpreting the characteristic video signals applied to them. The interpreter 38 is shown in detail in the FIGURE 3. These circuits may comprise temporary storage means with correlation matrices coupled to their outputs such as a resistor or diode matrix. The correlation matrices or networks, which form no part of the invention per se, provide means for determining the degree of correlation between a signal applied (e.g. a quantized video signal) and a reference signal. Since the quantized signal being applied is a dynamic signal, the degree of correlation varies as the signal is applied. As the correlation reaches a certain degree or condition, an output signal or threshold is achieved whereby a threshold signal (T) is produced. Thus, the correlation and threshold, though different, are interrelated. Reference may be had to the copending application Serial No. 107,488, filed May 3, 1961 and entitled "Character Reading Apparatus" for the details relating to suitable circuits to perform the functions of the recognition and correlation circuit 36.

The interpreter 38 provides a threshold (T) signal via the conductor 40 to the RCCS 22. At the same time, the interpreter 38 is conditioned to store signals (on capacitors 126) from the recognition circuits 36 which indicate the character being sensed by tube 14. The generation of the threshold signal is shown in more detail in the FIGURE 3 and will be discussed hereinafter. Clock pulses are supplied to the system by the clock pulse generator 42 after amplification to levels which are usable throughout the system. The clock pulses are supplied via a conductor 44. After the threshold signal T is supplied by the interpreter 38 via the conductor 40 to the RCCS 22, a plurality of separate, but interrelated, circuits are employed within the RCCS to generate a read command on the conductor 46 to the interpreter 38 at the appropriate time. The read command which is provided causes the signals stored in the interpreter to be detected whereupon the sensed character is indicated. When the read command on the conductor 46 is generated, the blanking circuits and erase operations are initiated from the RCCS 22 to the beam sweeps and blanking circuit 20 via the conductor 26. Subsequently, signals are generated from the RCCS 22 on the conductor 28 to reset the system for the reading of the next character.

When the document 12 is in position in front of the camera tube 14 and the strobe light 16 has been actuated, a signal is generated by the document (the signal generating means is not shown) to signal to the beam control that the document is in position. This signal is directed to the RCCS 22 via the conductor 48. After the character has been scanned and identified, recording means 50 are coupled to the interpreter 38 to record in any suitable manner the character or characters read.

Figure 2:
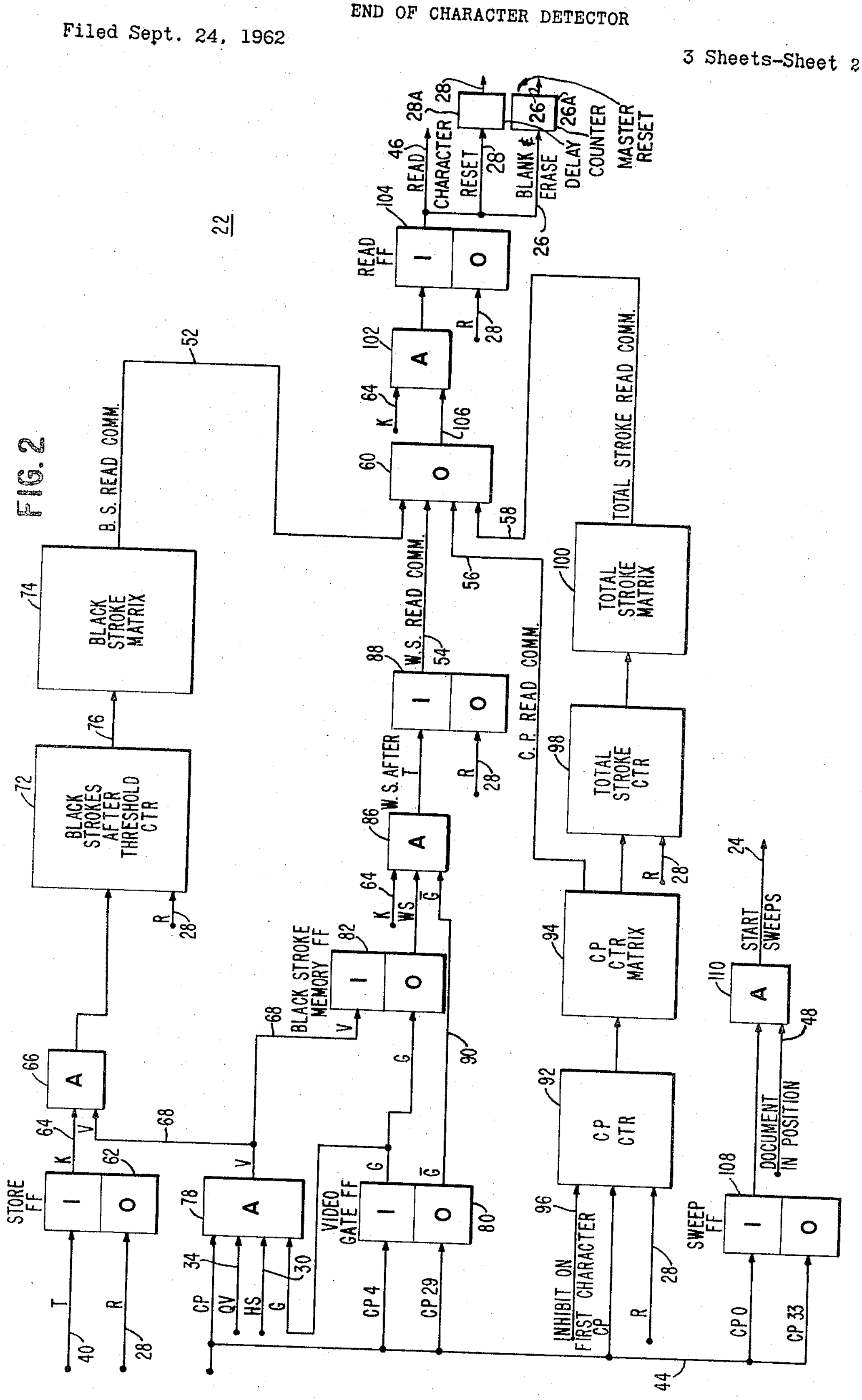
FIGURE 2 is a schematic diagram of the read command control system of FIGURE 1 showing the counters and matrices in block form.

Throughout the following description and drawings the following abbreviations are used:

T—threshold
R—reset
K—store
CP—clock pulse
QV—quantized video
HS—horizontal sweep
G—video gate open
$\overline{G}$—video gate not open
V—gated video
WS—white stroke
TS—total strokes The RCCS 22 of the FIGURE 1 is shown in detail in the FIGURE 2. The four separate channels for generating the read command on the conductor 46 to the interpreter 38 will be explained in detail. One channel is coupled to the black stroke read command conductor 52; another channel is coupled to the white stroke read command conductor 54; another channel is coupled to the clock pulse read command conductor 56; and, another channel is coupled to the total stroke read command conductor 58. The conductors 52, 54, 56 and 58 are all directed to an OR circuit 60.

The black stroke read command channel comprises the store flip-flop 62 which is adapted to receive the threshold signal on its "one" side from the conductor 40 and is reset at the appropriate time by the application of a pulse to the R conductor to the "zero" side of the store flip-flop 62. When the store flip-flop 62 has received the threshold signal on the conductor 40, the flip-flop 62 is set to its "one" side thus generating the K or store signal on the conductor 64. The voltage on the conductor 64 is directed to an AND gate 66 which also receives the gated video signal V on the conductor 68. The generation of the V signal on the conductor 68 will be discussed hereinafter. The output from the AND gate 66 is directed to the black strokes after threshold counter 72. The output of the counter 72 is directed to the black stroke matrix 74 via a conductor 76. The schematic of the black strokes after threshold counter 72 is shown in detail in the FIGURE 4 and the black stroke matrix 74 is shown in detail in the FIGURE 5. Before scanning a character, the store flip-flop 62 is set to its "zero" side by the reset signal R and no signal is generated on the black stroke read command conductor 52 until after the threshold signal T is applied to the store flip-flop 62 via the conductor 40. Upon the application of such a T signal, conductor 64 carries a signal to the AND gate 66 and, if black video signals occur on the conductor 68, gate 66 will provide a pulse to the black strokes after threshold counter 72 thus indicating that one black stroke has been encountered. The signal on the conductor 64 is a steady state signal and each time a pulse appears on the conductor 68, gate 66 will generate a pulse to the counter 72 indicating that black strokes were encountered during the scan. Black strokes are defined to mean that during a vertical scan of the scanning beam of the camera tube 14, one or more of the sample spots engaged a portion of the character and thus generated a black spot or a "black stroke." The black stroke matrix 74 is wired to emit a signal on the black stroke read command conductor 52 after a predetermined number of black strokes have been counted by the counter 72. In a specific embodiment of the invention, the wiring within the black stroke matrix 74 is such that a black stroke read command is generated after six black strokes have been counted.

Figure 3:
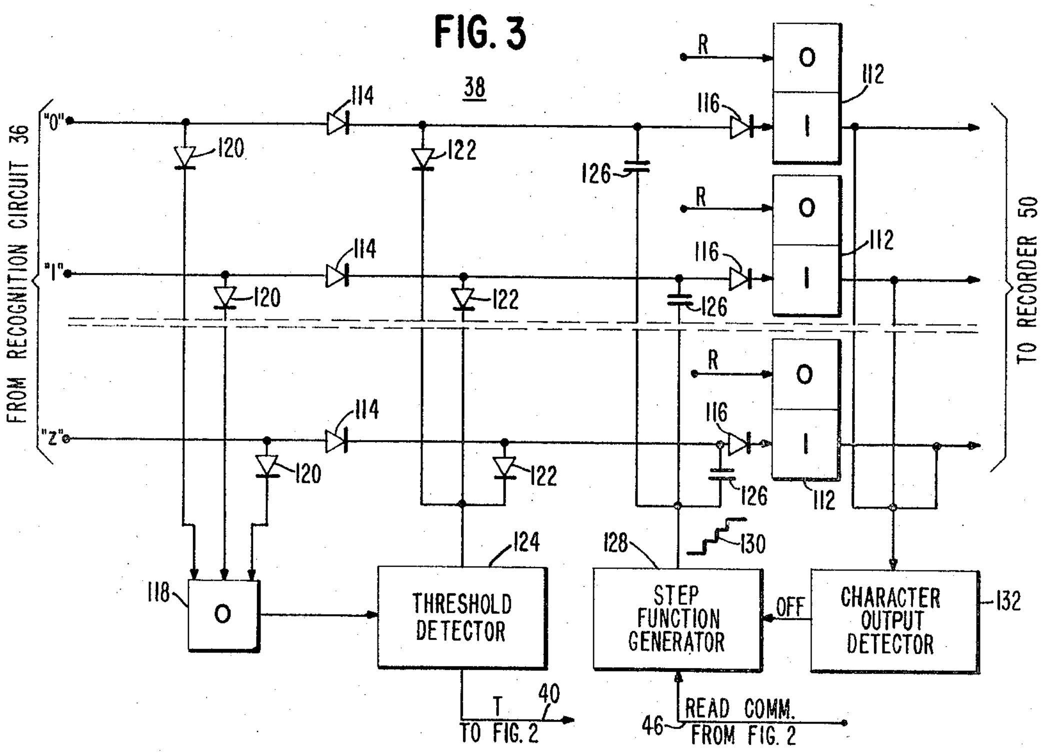
FIGURE 3 is a schematic diagram of the interpreter of FIGURE 1.

Thus, the black stroke read command channel, just described, will generate a read command on the conductor 52 after a predetermined number of black strokes have been counted after the threshold signal has been received from the interpreter circuit of the FIGURE 3. The black stroke read command, however, is ineffective if one of the other channels has previously detected that a read command should be generated and has so generated the read command. That is, the generation of a read command signal initiates the generation of a character reset signal. The character reset signal is applied to store flip-flop 62 and resets same. The black stroke read command channel is particularly effective when reading characters which are smudged or contain smudges between the characters since only the character itself will be scanned and the smudges between the characters will not be scanned since the circuits will be effective to generate outputs during this period.

The second channel which may generate a read command will do so after an all white scan has been encountered. An all white scan occurs when the scanning beam of the camera tube 14 does not engage or sample any spots which are portions of the character or extraneous ink. The white scans would normally occur between the characters. In the particular embodiment shown, a white scan read command will be generated after one white stroke has been encountered; however, the system may be readily adapted to generate the white stroke read command after two or more white strokes have been encountered. This adaptation may be achieved by substituting a counter, such as suggested by FIGURE 4 or the like, for flip-flop 88. The AND gate 78 provides video signals to both the black stroke channel and the white stroke channel.

In order for the AND gate 78 to generate the gated video signal V, the following conditions must be present: clock pulses must be available on the clock pulse conductor; quantized signals on the QV conductor must be present; the horizontal sweep of the camera tube 14 must be on and would be indicated by HS signals on that conductor; and, the video gate open signal G from the video gate flip-flop 80 must be present. The generation of the quantized video signals QV are shown in detail in the FIGURE 6 and the horizontal sweep signal HS may be derived from the beam sweep and blanking circuit 20 of the FIGURE 1 or may be taken from the start sweeps conductor 24, to be hereinafter described, of the FIGURE 2. With these conditions present, the V signal is generated on the conductor 68 to the gate 66 of the black stroke read channel and to the "one" side of black stroke memory flip-flop 82.

The video gate flip-flop 80 is set to its "one" side by clock pulse 4 and generates the video gate open signal G. Clock pulse 29 is directed to the "zero" side of the flip-flop 80 whose output indicates that the video gate is closed by the signal $\overline{G}$. In a particular embodiment of the invention, each vertical scan of the vertical beam takes place during forty clock pulses. The video gate is open at clock pulse 4 and closed at clock pulse 29. The beam is blanked during the time when the gate is not open. The video gate flip-flop 80 is open only during the time CP4 to CP29 in order to avoid the transient problems encountered during the initiation and termination of character scan sweeps. Thus, any transients in the video signals have been damped prior to the opening of AND gate 78 by the application of signal G.

The white stroke channel may be considered to start with black stroke memory flip-flop 82 which is an A.C. coupled flip-flop and detects whether a black stroke V has been generated by AND gate 78. If a black stroke has not been generated, then only white strokes were generated. The black stroke memory flip-flop 82 receives the video gate open signal G on its "zero" side, from the "one" side of the video gate flip-flop 80. The leading edge of the G signal is available when flip-flop 80 is switched at clock pulse 4, so that in the absence of a video signal V the black stroke memory flip-flop 82 will be driven to its "zero" side and indicate a white stroke to AND gate 86. If a V signal is applied after the G signal, the leading edge thereof switches flip-flop 82 to its "one" side and no white stroke signal WS is indicated. Since flip-flop 82 is A.C. coupled, a G signal (the leading edge thereof) is required (after a V signal) to reset the flip-flop to the "zero" side.

The gate 86 also receives the store signal K from the "one" side of the store flip-flop 62 (after the T signal is generated) and the $\overline{G}$ signal (video gate not open) from the "zero" side of the video gate flip-flop 80 which $\overline{G}$ signal is produced at clock pulse 29. Gate 86 will generate a white stroke after threshold signal to the white stroke counter flip-flop 88 only if: (1) threshold has been reached and the store signal K is present on conductor 64; (2) the black stroke memory flip-flop 82 indicates, by being set to the "zero" state by a G signal, that a white stroke has been encountered and a signal is provided on the WS conductor; and, (3) the video gate is not open as indicated by the signal $\overline{G}$ on conductor 90. If these conditions are present at gate 86, then a white stroke has been generated after threshold and the white stroke read command on the conductor 54 is directed to the OR circuit 60 by virtue of the white stroke counter flip-flop 88 being switched to its "one" side. Clearly, a white stroke after threshold suggests that a character has been detected, completely scanned (and recognized) and a white stroke has been detected thereafter. Thus, all of the black strokes must have terminated.

The remaining channels for generating the read command, namely the clock pulse read command on the conductor 56 and the total stroke read command on the conductor 58 operate from similar functions and are disabled during the reading of the first character. This is necessary since the scanning beams of the camera tube 14 are searching for the location of the first character and it is not known at this time how many clock pulses or total strokes are necessary to completely scan the first character. After the first character has been located, then the inhibit on the first character signal is no longer present and these two channels will generate the read commands if either of the previous read commands have not generated the read command signal. The clock pulse read channel comprises a clock pulse counter 92 for counting the number of clock pulses. Coupled to receive the output of the clock pulse counter 92 is the clock pulse counter matrix 94 which generates a read command after a predetermined number of clock pulses have been generated. If fifteen scans will normally scan a character and there are forty clock pulses per scan, then the clock pulse counter matrix 94 would be wired to emit a clock pulse read command after 600 clock pulses have been counted by the counter 92. When the system is actuated to initially read and search for the first character of a field of characters, a pulse may be generated on the inhibit on first character conductor 96 by a convenient means known in the art. For example, a flip-flop (not shown) may normally reside in the proper state to supply an inhibit signal. The flip-flop may then be switched by the application thereto of a read signal (conductor 46) or a signal from OR gate 60.

Since the total strokes are a function of the number of clock pulses, a total stroke counter 98 is connected to receive the output from the clock pulse counter matrix 94 each time a sufficient number of clock pulses have been generated to equal one stroke. Coupled to the output of the total stroke counter 98 is the total stroke matrix 100 which generates a total stroke read command on the conductor 58 after a predetermined number of vertical strokes have been made by the scanning beam of the camera tube 14. Of course, this channel will be ineffective to generate the read command if it has already been generated by one of the other channels. That is, the production of a read command signal by any channel will reset or disable the other channels (as discussed infra) whereby duplicate read command signals are not generated.

The four channels are connected to the OR circuit 60 via the conductors 52, 54, 56 and 58. The OR circuit 60 directs its output to an AND gate 102. Gate 102 generates a signal to a read flip-flop 104 only if a read command has been generated by one of the channels and is indicated by a signal on conductor 106 concurrently with the application of store signal K on the conductor 64 from the store flip-flop 62. When the gate 102 generates an output signal (indicating a read command), the read flip-flop 104 will be set to its "one"side and indicate a read command to the interpreter 38 via the conductor 46. In addition, the elements of the system are reset by a signal on the conductor 28. The signal on conductor 28 is produced by the read signal fed to a delay element 28A which may provide a time delay of at least one scanning stroke duration, which in the embodiment shown may be on the order of several hundred microseconds. The camera tube will perform blanking and erase operations by a signal on the conductor 26 after the end of a complete field of characters has been scanned. This condition may be detected by supplying a counter 26A which counts the read or reset signals and provides a signal when a predetermined number of such signals have been encountered.

The sweep flip-flop 108 will start and stop the sweeps. In practice, the vertical sweep may be operative at all times and just the horizontal sweep actuated. Clock pulse 0 will start the sweeps by setting the sweep flip-flop 108 to its "one" side and clock pulse 33 will inhibit the sweeps by setting the sweep flip-flop 108 to its "zero" side. If a document is in position to be read, then this condition is so indicated by a signal on the document in position conductor 48 to an AND gate 110 and if the sweep flip-flop 108 has been set to its "one" side then the sweeps are started by a pulse on the conductor 24 to the beam sweeps and blanking circuit 20.

Figure 4:
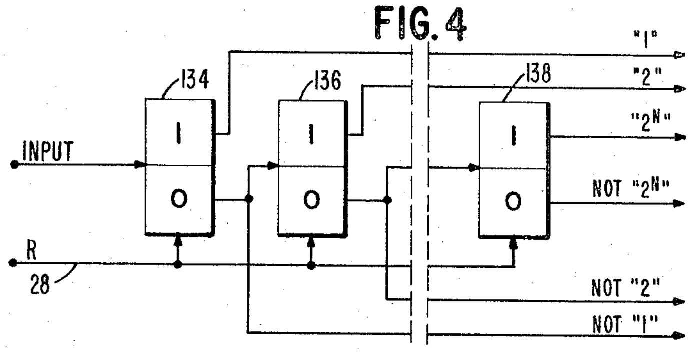
FIGURE 4 is a schematic diagram of the counters employed in FIGURE 2.

Thus, the four channels of the FIGURE 4 are effective to generate a read command (which may be termed a recognize command). The first channel to indicate that the read command has been generated, will cause the interpreter circuit 38 (shown in detail in the FIGURE 3) to recognize the character and commence operations to read the next character. After one of the read command channels has generated the read command, the remaining channels are ineffective to generate a read command since they would be reset at substantially the time of the generation of the initial read command. If one of the channels should have indicated the read command but for some reason or condition has failed to do so, then one of the remaining channels will shortly so generate the command and thus, provide proper recognition and reading in a minimum of time.

The interpreter circuit 38 of the FIGURE 1 is shown partly in schematic and partly in block diagram form in the FIGURE 3. The function of the interpreter 38 is to generate the threshold signal T at the appropriate time and to receive the read command for identifying the character scanned.

The input conductors "0," "1" through "Z" from the recognition circuits 36 will be provided with varying potentials during scanning of the character.

Each of the character conductors is coupled to the "1" side of an associated flip-flop 112 through the series connected diodes 114 and 116. The flip-flops 112 are reset at the appropriate time by the application of a signal to its "0" side. Each of the character conductors is coupled to an OR circuit 118 through diodes 120. In addition, the diodes 122, connected from each of the character conductors between the diodes 114 and 116, are connected to a threshold detector 124. The output of the OR circuit 118 is directed to the threshold detector 124 and the function of the threshold detector is to block the discharge path through the diodes 122 when a threshold value is attained. The threshold detector 124 may be any type of biased amplifier, for example a differential amplifier, which is biased to conduct at a predetermined voltage level. Also coupled to the character conductors between the diodes 114 and 116 are the parallel capacitors 126 whose other terminal is coupled to a step function generator 128. The step function generator 128 is a conventional amplifier (when triggered by a read command signal on conductor 46) capable of applying an incrementally increasing voltage waveform such as that shown at 130 to the capacitors 126. The outputs from the flip-flops 112 are coupled to the recorder 50 of the FIGURE 1 and also to a character output detector 132 whose output is directed to turn off the step function generator 128. The character output detector is a conventional amplifier which conducts and generates the off signal to the step function generator 128 as soon as one of the flip-flops 112 has been placed in its "one" state.

The operation of the interpreter circuit of the FIGURE 3 is as follows: While the character is being scanned by the scanning circuits of the camera tube 14, varying voltages will be applied to the character conductors and to the OR circuit 118. The discharge path through the diodes 122 will prevent the capacitors 126 from charging and remaining at any appreciable voltage. Near the end of the scanning process, the voltage on one of the character conductors (correlation is being reached) will rise to a voltage level sufficient to trigger the threshold detector 124 "via the OR gate 118" and, thus, back-bias and block the discharge path through the diodes 122. This action permits each of the capacitors 126 to charge to the voltage of its associated conductor. As the threshold detector 124 is actuated and back-biases the diodes 122, the threshold signal T on the conductor 40 is generated to the RCCS 22 of the FIGURES 1 and 2. Subsequently, one of the read command channels of the FIGURE 2, previously discussed, will generate the read command on the conductor 46 which will commence operation of the step function generator 128 of the FIGURE 3. The flip-flops 112 are biased to change to their "one" state at a predetermined level. The step waveform 130 from the step function generator 128 is applied to the capacitors 126 and the character conductor having the highest voltage impressed thereon will be the first conductor to reach the voltage necessary for changing the state of its associated flip-flop 112 and thus indicate that that particular character has been scanned. As soon as one of the flip-flops 112 switches to its "one" state, the recorder 50 may record which character was recognized and also the output from the flip-flops 112 are applied to the character output detector 132 to turn off the step function generator 128. Thus, the reading of the character has been completed and the system, after being reset, is ready to commence scanning and recognizing the next character.

The FIGURE 4 is a schematic of a type of counter which may be employed in the counters 72, 88, 92 or 98 of the FIGURE 2. The counter comprises a plurality of flip-flop stages 134, 136 and 138. As each input is applied, the counter will successively step the pulse along the line and an examination of the counter will reveal the number so stored in the counter according to the position and condition of each of the flip-flops. An output from both the "one" side and the "zero" side of the counter is directed to the matrix of the FIGURE 5.

Figure 5:
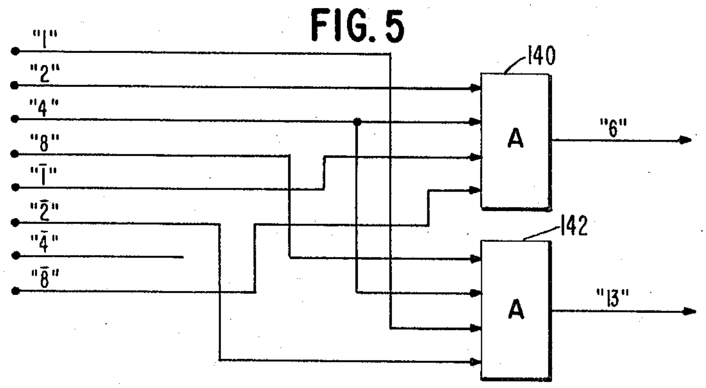
FIGURE 5 is a typical portion of the matrices of FIGURE 2 and showing the generation of two digits.

The FIGURE 5 discloses the internal wiring that may be utilized in the matrices 74, 94 and 100 of the FIGURE 2. In the example shown in the FIGURE 5, two digits have been derived. If, for example, it is desired to count six black strokes after the threshold signal, then the black stroke matrix 74 would be wired as shown with the following inputs to the AND gate 140: the "digit 2" input, the "4" input, the "$\bar{1}$," and the "$\bar{8}$." As can be seen, this is a logical function of Boolean terms and is a binary coded decimal to decimal conversion. Similarly, the inputs "8," "4," "1" and "$\bar{2}$" to the AND circuit 142 would generate an output at the decimal 13, as shown.

The FIGURE 6 discloses a manner in which the quantized video signals may be generated. The video amplifier and shaping circuit 32 directs its output to AND circuit 144. If video signals are present to the gate 144 at clock pulse 4, a flip-flop 146 will be set to its "one" side whose output will indicate the quantized video signals QV on the conductor 34. At clock pulse 29, the flip-flop 146 is reset to its "zero" side, thus, indicating that the video gate is closed until the next vertical stroke.

The operation of the individual circuits has been detailed. The operation of the entire system will now be given. With reference to the FIGURE 1, as the character-bearing document 12 passes in front of the face of the camera tube 14, means (not shown) cause the strobe light 16 to illuminate the document which leaves an impression of the characters on the face of the camera tube 14. The camera tube 14 may be of the vidicon type, whose operation is well known in the art. After the impression of the characters has been retained on the face of the camera tube 14, a pulse on the conductor 48 (document in position) of the FIGURE 2 will be applied to the gate 110. At clock pulse 0, the sweep flip-flop 108 will be set to its "one" side thus causing a signal on the start sweeps conductor 24 from the RCCS 22 to the beam sweeps and blanking circuit 20, (FIGURE 1). It is assumed that the system has been reset previous to this operation and that the beam was blanked after the photosensitive screen of the camera tube 14 was erased (charged up) and prepared for the characters prior to the strobing of the light source 16.

Since the sweeps of the camera tube 14 are now searching for the first character, the clock pulse read command channel and the total stroke read command channel must be disabled since the location of the first character is not known. If these two channels were not disabled, a read command may be generated before or during the early scanning of a character thus producing erroneous results.

In a particular embodiment of the invention, each vertical sweep of the scanning beam takes place over a period of forty clock pulses. At CP 0 the sweeps are turned on; at CP 4 the video gate is opened thus permitting video information to flow to the recognition circuits 36; at CP 29, the video gate is closed thus inhibiting the flow of information (whether the sampled spot was black or white) to the recognition circuits 36; and, at CP 33 the electron beams are inhibited to permit retracing and blanking to continue until CP 0.

Now the image of the character field on the character bearing document 12 has been retained on the face of the camera tube 14 and the sweep generators are operating to search for the location of the first character. At this time, the clock pulse read command channel and the total stroke read command channel have been disabled for reasons previously set forth. As the sweeps continue, the beam will eventually sample portions of the character and thus derive some information for the recognition circuits 36 to process. As the sweeping continues, the interpreter circuit of the FIGURE 3 will receive varying voltage levels on its character conductors and the capacitors 126 do not charge at this time since a discharge path through the diodes 122 is available for any voltage appearing on the character conductors. Near the end of the scan process, the voltage on one of the character conductors will rise to a level higher than the predetermined level which, through the OR circuit 118, will trigger the threshold detector 124 and do two things. First, threshold signal T on the conductor 40 will be applied to the store flip-flop 62 of the FIGURE 2 and; second, the diodes 122 will be back-biased and remove the discharge path for the voltages appearing on the character conductors. Accordingly, the capacitors 126 will now charge to a value approximately equal to the potential on their associated character conductor. With the store flip-flop 62 now in its "one" position, the store signal K is available on the conductor 64 to the gates 66 and 86, causing actuation of the black stroke read command channel and the white stroke read command channel. The black stroke read command channel will permit only a predetermined number of effective vertical sweeps of the beam after threshold. The white stroke read command channel is looking for the first all white stroke to generate the read command. The first channel to arrive at its predetermined conditions, will generate the read command to cause a recognition of the character scan, inhibit all other read command systems and reset the circuits.

At this time, the conditions present at gate 78 cause a signal to appear on conductor 68. On the gate 78, clock pulses are available, quantized video QV is available on the conductor 34, the horizontal sweep is on as indicated from either the conductor 24 from the gate 110 or on the conductor 30, and the video gate is open as indicated on the video gate G conductor. The concurrent application of the V and K signals to AND gate 66 produces outputs to the black strokes after threshold counter 72 to count each black stroke after threshold. If it has been determined that six black strokes are to be scanned after threshold, then the black stroke matrix 74 will produce a black stroke read command on the conductor 52 at the end of six black strokes. The above conditions are not operative to produce a read command if the white stroke read command channel has already generated the read command.

During the same time that the black stroke read command channel is effective, the white stroke read command channel is searching for the first all white stroke after threshold. If a black stroke is encountered after threshold, the black stroke memory flip-flop 82 will be set to its "one" side by a pulse on the conductor 68 and when the gate 86 "searches" to determine if a white stroke has been generated, it will find that since the black stroke memory flip-flop 82 is in its "one" side then no white stroke has occurred as yet. The black stroke memory flip-flop is reset by signal G to its "zero" side indicating a white stroke WS and is only switched to its "one" side if black video is encountered. Thus, after the video gate closes at clock pulse 29 and the store signal K is available on the conductor 64, the gate 86 "searches" for the presence of a white stroke. If the three conductors as shown to the gate 86 have the proper potentials applied thereto, a white stroke has been encountered after threshold, the white stroke counter flip-flop 88 is set to its "one" side, and a read command is generated on this channel. If the black stroke read command channel has already generated a read command, then the white stroke read command channel is ineffective to generate the command for this character since it is not needed.

The white stroke read command channel is particularly effective during the scanning of the shorter horizontal width characters since a read command will be generated as soon as an all white stroke is encountered. The black stroke read command channel is particularly effective when reading characters that are smudged or have smudges between the characters. Clearly if this condition is present, it is not possible to generate a white stroke read command but it is possible to obtain a read command after a predetermined number of black strokes have been encountered after threshold, which the black stroke command channel will perform.

After a read command has been generated and indicated to the OR circuit 60, the conditions are present to produce an output from the AND gate 102 to set the read flip-flop 104 in its "one" state and thus produce the read command on the conductor 46. This read command is applied to the step function generator 128 of the FIGURE 3. In the meantime, the circuits will be subsequently reset. The step function generator 128 now produces the stairstep waveform as shown at 130 and applies this stair-step voltage in increments to the capacitors 126. Immediately prior to the application of the stair-step voltage, the capacitors 126 were at various voltage levels depending upon the degree of correlation obtained in the correlation or recognition circuits 36 of the FIGURE 1. However, one of the capacitors 126 will be at a higher voltage than the others and as the stair-step voltage is applied, will reach a potential sufficient to trigger its associated flip-flop 112 to its "one" state thus indicating that that particular character has been read. Simultaneously, a pulse is directed to the character output detector 132 whose output will turn off the step function generator 128.

Thus, the first character has been read, recognized and recorded. The process of scanning and recognizing the remaining characters continues in a substantially identical manner except that the inhibit on the first character pulse on the conductor 96 is removed and the clock pulse read command channel and the total stroke read command channel on the conductors 56 and 58, respectively, are now also effective in addition to the black stroke read command channel and white stroke read command channel to generate the read command. At the end of scanning a field of characters, the camera tube face is erased or "charged up."

Thus, there has been described an end of character detector wherein the character bearing document is passed in front of a face of a television camera tube and a strobing light source causes images of the characters on the character bearing document to be retained on the face of the camera tube. The horizontal and vertical sweep circuits (if the vertical sweep is not continuously operative) of the camera tube commence sweeping across the character which provides signals that are peculiar to each character so scanned. Near the end of the scanning of a character, character recognition circuits will indicate that a particular threshold level has been reached (correlation is imminent) and that the signals generated must be identified in order to identify the character so scanned. A plurality of channels are now employed to command read at the appropriate time after the threshold signal has been generated. The first means to indicate that the read command should begin will cause such action and the failure of one of the means to command read will be overridden by any one of the other separate systems to command read.

It is necessary to maintain proper identification and character reading speeds, that the read command be given as soon as possible. If smudges are present between the characters, conventional circuits will continue scanning this area and cause erroneous output signals to be generated. The present invention employs a plurality of separate channels to determine when the end of the character has been reached in the scanning process and thus provide a read signal, and immediately prepare for the reading of the next character. One of the channels for generating the read command employs a preset counter to count the number of black video strokes after the threshold signal has been generated. Employment of this channel will provide a rapid identification of the characters having short horizontal widths and will inhibit the scanning operation from scanning smudges or smears contained between the characters. A second channel is effective to generate a read command to the recognition circuits as soon as an all white video stroke is encountered after the threshold signal has been generated. If the white video stroke is encountered before the number of black video strokes after threshold has expired, then for rapid operation the white video stroke counter will generate the read command. Additional channels for generating the read command comprise the incorporation of a preset counter which will permit scanning for a predetermined number of strokes or permit scanning during a time equal to a predetermined number of clock pulses. The total number of strokes channel and clock pulse counting channel are ineffective while reading or searching for the first character of the character field.

The invention may be embodied in other specific forms without departing from the spirit and essential characteristics of our invention. The present embodiment is, therefore, to be considered in all respects as illustrative and the scope of the invention being indicated by the appended claims rather than the foregoing description, and all changes which come within the meaning and range of the equivalency of the claims are therefore intended to be embraced therein.

What is claimed is:

1. A character recognition system comprising means to successively scan a plurality of characters to derive characteristic outputs therefrom, correlation means coupled to receive said outputs and to indicate on a plurality of conductors the degree of correlation between the character being scanned and a plurality of known characters, means to interrogate said conductors for deriving a signal indicating that correlation approaches, means coupled to receive said signal for controlling the duration of the scanning action after said signal is received, and means coupled to said last named means for initiating an interrogate command at the end of the duration of the scanning action.

2. A character recognition system comprising means to scan in successive strokes a plurality of characters and derive characteristic outputs therefrom, correlation means coupled to receive said outputs and to indicate on a plurality of conductors the degree of correlation between the character being scanned and a plurality of known characters, means to interrogate said conductors for deriving a signal as correlation approaches, counter means actuated by said signal for permitting an additional predetermined number of said scanning strokes after receipt of said signal, and means coupled to said counter for generating an interrogate command when said counter has reached the predetermined number.

3. A character recognition system comprising means to scan in successive strokes a plurality of characters and derive characteristic outputs therefrom composed of black and of white video stroke pulse patterns, correlation means coupled to receive said outputs and to indicate on a plurality of conductors the degree of correlation between the character being scanned and a plurality of known characters, means to interrogate said conductors for deriving a signal as correlation approaches, bistable means coupled to said means to scan and normally indicating a white video stroke and settable to indicate a black video stroke, circuit means coupled to said bistable means and adapted to receive said signal, said circuit means permitting an additional predetermined number of white video scanning strokes after receipt of said signal, and means coupled to said circuit means for generating an interrogate command when said predetermined number is reached.

4. An end-of-character detector for a character recognition scanning system wherein the scanning system derives characteristic output signals from black and white video strokes according to whether a portion of a character is encountered in a scanning stroke, comprising means for receiving the characteristic output signals, means coupled to the first named means for generating a threshold signal as correlation of the character approaches, means for counting the number of black video strokes after receipt of the threshold signal, said means for counting being connected to said means for receiving and to said means for generating a threshold signal,and means to generate a read command after receipt of a predetermined number of black video strokes, said means to generate a read command being connected to said means for generating a threshold signal and to said counting means.

5. An end-of-character detector for a character recognition scanning system wherein the scanning system derives characteristic output signals from black and white video strokes according to whether a portion of a character is encountered during a scanning stroke, comprising means for receiving the characteristic output signals, means coupled to the means for receiving for generating a threshold signal as correlation of the character approaches, first means coupled to receive said threshold signal and count the number of black video strokes after receipt of the threshold signal, second means coupled to said threshold signal for determining the number of white video strokes after receipt of said threshold signal, and means coupled to said first means and to said second means for generating a read command as indicated by said first means or by said second means.

6. A character recognition system comprising, scanning means for utilizing a spot sampling technique in successive strokes to scan a plurality of characters and derive characteristic outputs therefrom, said outputs being in the form of black video strokes if a portion of a character is encountered in a stroke and white video strokes if no part of the character is encountered in a stroke, correlation means coupled to receive said outputs and to indicate on a plurality of conductors the degree of correlation between the character being scanned and a plurality of reference characters, means to interrogate said conductors for deriving a signal as correlation approaches, means coupled to said scanning means for limiting the number of scanning strokes, and means coupled to said last named means for initiating an interrogate command when the number of scanning strokes have been completed, said means coupled to said scanning means including a first counter coupled to receive a signal from said interrogation means and permit a predetermined number of black video strokes after receipt of the signal for initiating the interrogate command and a second counter coupled to receive a signal from said interrogation means for permitting a predetermined number of white video strokes after receiving the signal before initiating the interrogate command.

7. In combination, means for scanning characters and producing signals in accordance therewith, means connected to said scanning means for recognizing said characters as a function of the signals produced thereby, means connected to said recognizing means for producing a trigger signal when said means for recognizing has attained a predetermined degree of recognition of a character. and means connected to outputs of said scanning means and said trigger means for terminating the scanning of the character in response to said trigger signal, said means for terminating including at least one network which produces a command signal which is applied to an input to said means for recognizing whereby an output signal indicative of the identity of the scanned character is produced.

8. The combination recited in claim 7 wherein said terminating means operates on scan information which indicates that a character portion has been detected comprising, a flip-flop having one input connected to said means for producing a trigger signal, said flip-flop producing an output signal only in response to the application thereto of a trigger signal, first gate means which produces an output which is indicative of the scanning of a character portion, second gate means for receiving the signals produced by said flip-flop and said first gate means and producing an output signal only in response to the concurrent application of the input signals thereto, and means for counting the output signals produced by said second gate means, said means for counting producing said command signal in response to the counting of a predetermined number of signals.

9. A character recognition system including, means for recognizing a character, means for indicating when actual recognition of a character is imminent, a first bistable device which produces a signal only in response to a signal from said means for indicating, a second bistable device which produces one signal only during a predetermined operating period and a second signal at other times, first gate means which produces an output signal only in response to the concurrent application of signals from said means for recognizing and said one signal from said second bistable device, a third bistable device connected to receive signals from said second bistable device and said first gate means on separate inputs and to produce an output signal only in the absence of a signal from said first gate means, second gate means which produces an output signal only in response to the concurrent application of signals thereto from said first bistable device and said first gate means, means for counting the signals produced by said second gate means and producing an output signal only after a predetermined count has been achieved, third gate means for producing an output signal only in response to the concurrent application thereto of signals from said first bistable device and said third bistable device as well as said second signal from said second bistable device, means for counting the signals produced by said third gate means and producing an output signal only after a predetermined count has been achieved, fourth gate means connected to each of said counting means for producing an output signal in response to the application of an input signal from one of said counting means, and fifth gate means for producing an output signal only in response to the concurrent application thereto of signals from said first bistable device and said fourth gate means.

10. A character recognition system including, means for recognizing characters, means for indicating when actual recognition of a character is imminent, a first bistable device which produces a signal only in response to a signal from said means for indicating, a second bistable device which produces one signal only during a predetermined operating period and a second signal at other times, first gate means which produces an output signal only in response to the concurrent application of said one signal from said second bistable device and signals from said means for recognizing, a third bistable device connected to receive signals from said second bistable device and said first gate means on separate inputs and to produce an output signal only in the absence of a signal from said first gate means, second gate means which produces an output signal only in response to the concurrent application of signals thereto from said first bistable device and said first gate means, first means for counting the signals produced by said second gate means and producing an output signal only after a predetermined count has been achieved, third gate means for producing an output signal only in response to the concurrent application thereto of signals from said first bistable device and said third bistable device as well as said second signal from said second bistable device, second means for counting the signals produced by said third gate means and producing an output signal only after a predetermined count has been achieved, means for supplying regularly recurring signals, third counting means connected to said signal supplying means to count the signals supplied thereby, said counting means producing an output signal only when a predetermined count has been achieved, fourth gate means connected to each of said counting means for producing an output signal in response to the application of an input signal from one of said counting means, and fifth gate means for producing an output signal only in response to the concurrent application thereto of signals from said first bistable device and said fourth gate means.

11. The character recognition system recited in claim 10 including means connected to said third counting means for selectively inhibiting the operation thereof.

12. An end-of-character detector for a character recognition scanning system wherein the scanning system scans in successive strokes and derives characteristic output signals from black and white video strokes according to whether a portion of a character is encountered in a scanning stroke comprising, means to receive the characteristic output signals, means coupled to said means to receive the characteristic output signals to generate a threshold signal as correlation of the character approaches, a plurality of individual channels coupled to the means to receive and generate a signal within each channel capable of individually initiating an interrogate signal during or after completion of the scanning of a character, said plurality of individual channels including a first channel for generating a command signal after completion of a predetermined number of strokes, a second channel coupled to receive the threshold signal and capable of generating a command signal after completion of a predetermined number of black video strokes, and a third channel coupled to receive said threshold signal and capable of generating a command signal after completion of a predetermined number of white video strokes after receipt of said threshold signal, means connected to each of said channels for receiving the command signals therefrom, said last named means being responsive to the first command signal from one of the individual channels for generating a further signal to said means to receive the characteristic output signals to cause a read command for determining the character scanned.

References Cited by the Examiner

UNITED STATES PATENTS

| | | | |
|---|---|---|---|
| 2,838,602 | 6/1958 | Sprick | 340—146.3 |
| 2,877,951 | 3/1959 | Rohland | 340—146.3 |
| 2,889,535 | 8/1962 | Rochester et al. | 340—146.3 |
| 3,050,711 | 8/1962 | Harmon | 340—146.3 |
| 3,088,097 | 4/1963 | Steinbuck et al. | 340—146.3 |
| 3,160,855 | 12/1964 | Holt | 340—146.3 |
| 3,213,422 | 10/1965 | Fritze et al. | 340—146.3 |
| 3,246,296 | 4/1966 | Heizer et al. | 340—146.3 |

OTHER REFERENCES

"Reading by Electronics," published by Wireless World, April 1957, pp. 173–175.

MAYNARD R. WILBUR, *Primary Examiner.*

MALCOLM A. MORRISON, *Examiner.*

J. E. SMITH, *Assistant Examiner.*